Patented Aug. 23, 1949

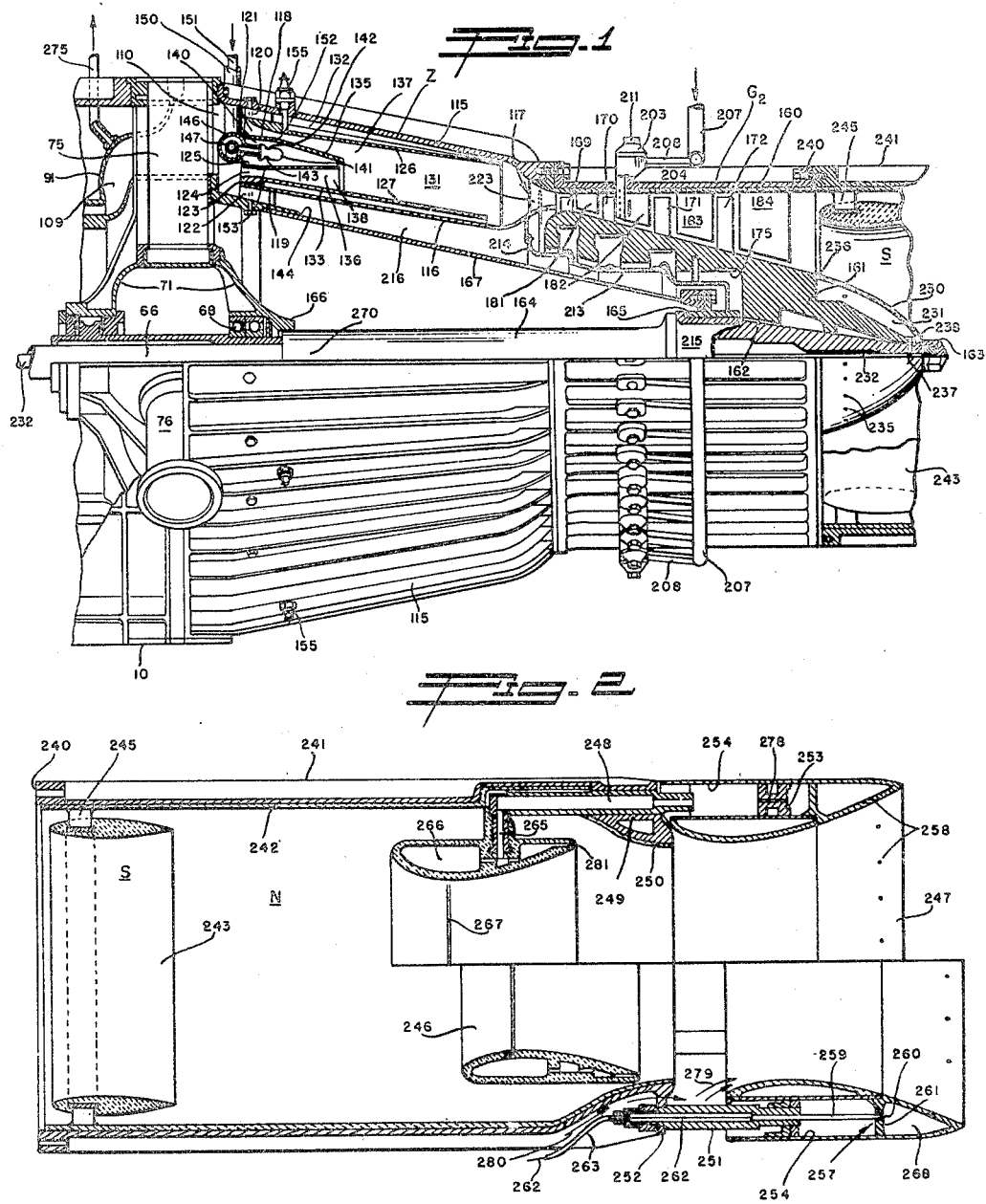

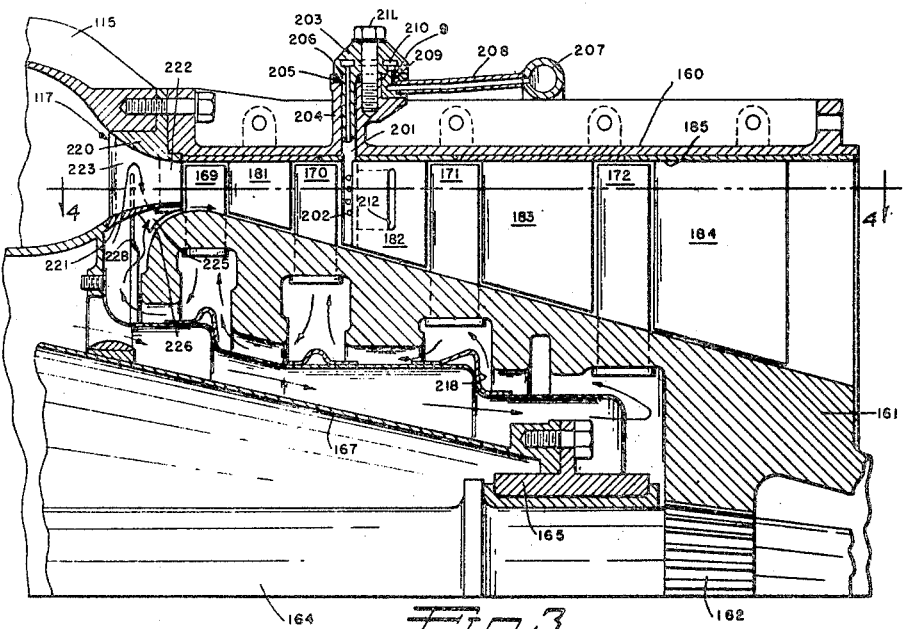
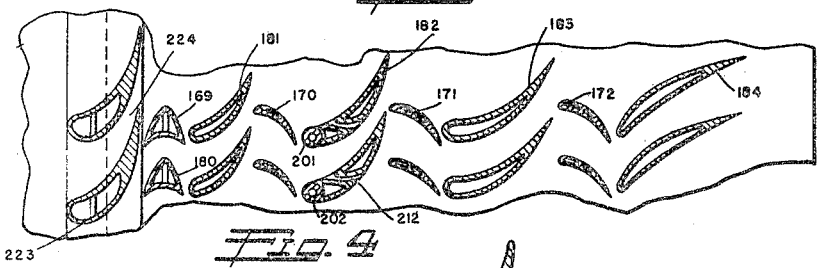
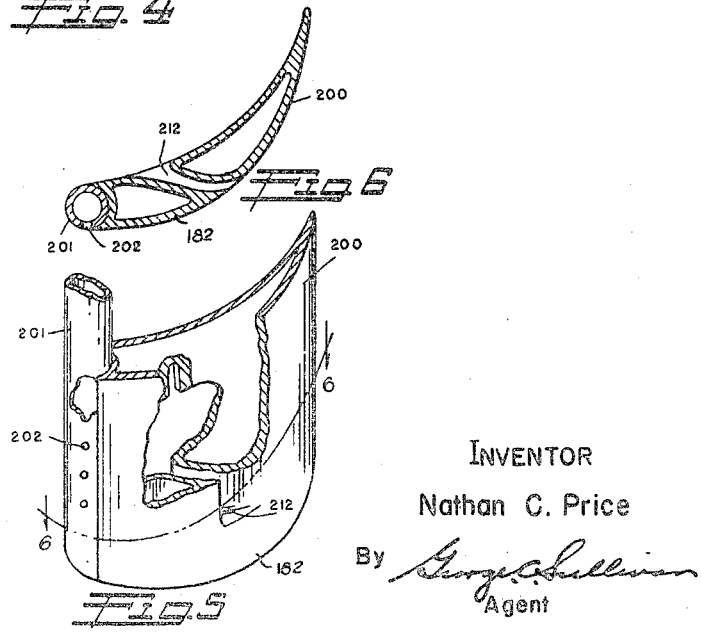
INVENTOR
Nathan C. Price
By
Agent

2,479,777

UNITED STATES PATENT OFFICE 2,479,777

FUEL INJECTION MEANS FOR GAS TURBINE POWER PLANTS FOR AIRCRAFT

Nathan C. Price, Hollywood, Calif., assignor to Lockheed Aircraft Corporation, Burbank, Calif.

Original application May 22, 1943, Serial No. 488,029, now Patent No. 2,468,461, dated April 26, 1949. Divided and this application February 16, 1945, Serial No. 578,302

13 Claims. (Cl. 60—35.6)

This invention relates to prime movers, and relates more particularly to power plants of the internal combustion reaction type useful in the propulsion of aircraft and other high-speed vehicles. The present application is a division of application, Serial No. 488,029, filed May 22, 1943, and entitled "Aircraft powerplant," now Patent No. 2,468,461.

In my copending application, above referred to, I have disclosed an internal combustion reaction type engine, particularly adapted for the propulsion of aircraft, and comprising briefly, multistage air compressor means, a gas turbine driving the compressor means, a primary combustion chamber interposed between the compressor means and the gas turbine, a secondary combustion zone and a propulsive reaction nozzle for the high velocity discharge of the gases of combustion. The gaseous products of combustion are fed directly from the primary combustion chamber into the expansion zone of the gas turbine to effect efficient turbine operation. Optimum efficiency of the power plant is probably obtainable by full fuel combustion in the primary combustion chamber, but metallurgical and structural limitations prohibit total fuel combustion in the primary chamber since full combustion at this zone would result in temperatures in excess of those allowable in practical gas turbine design and operation. It is, therefore, a general object of the invention to provide a power plant of the internal combustion reaction type characterized by an improved fuel supply or injection system providing for the injection of fuel at spaced points in a manner to obtain the most efficient operation consistent with practical allowable temperatures throughout. The invention provides for the injection of fuel in the primary combustion chamber, into the expansion zone of the gas turbine and into the secondary combustion chamber, which is in down-stream relation to the turbine, by independent although coordinated injection means, thereby obtaining high efficiency operation without excessive temperatures at any point or zone of the engine.

It is another object of the invention to provide a power plant of the character referred to in which the supplemental fuel injection means at the expansion zone of the gas turbine is associated with one or more rows of the blading therein to inject fuel at points where it is immediately broken up and intimately mixed with the combustion gases issuing from the primary combustion chamber. The combustion gases from the primary combustion chamber are rich with unconsumed air, which fully supports the combustion of the supplemental fuel thus injected and admixed in the turbine expansion zone. In accordance with this feature of the invention, a portion of the unconsumed air leaving the primary combustion chamber is utilized to support combustion in the expansion zone of the turbine, thereby materially increasing the efficiency of the power plant as a whole.

Another object of the invention is to provide a power plant of the character mentioned employing stator blades or intermediates, of special configuration having orifices at their leading edges for the injection of liquid fuel or a mixture of liquid fuel and air, with slots extending through the blades intermediate their leading and trailing edges to aid in effecting a proper mixture of the injected fuel with the gases passing through the expansion zone of the turbine. The slots in the blading also broaden the efficient operating range of the angles of attack of the gases passing therethrough from the upstream turbine stages.

A further object of the invention is to provide a power plant of the character mentioned embodying a second supplemental fuel means serving to discharge a fine spray of mixed vaporized and atomized fuel from the apex portion of the turbine wheel into the secondary combustion chamber to mix with the high velocity gases issuing from the gas turbine and to impinge against a refractory baffle of the throat of the supplemental combustion chamber. The supplemental fuel is consumed at the forward portion or throat of the secondary combustion chamber to obtain optimum efficiency at the reaction nozzle and augmenter.

Other objectives and advantages of the invention will become apparent from the following detailed description, throughout which reference will be made to the accompanying drawings in which:

Figure 1 is a fragmentary sectional elevation of the combustion chamber and gas turbine portion of the power plant of this invention;

Figure 2 is a longitudinal sectional view of the nozzle portion of the power plant;

Figure 3 is an enlarged fragmentary cross sectional detail of a portion of the gas turbine shown in Figure 1;

Figure 4 is a fragmentary cross sectional view showing the developed general arrangement of the turbine blades and counter-vanes as viewed from line 4—4 on Figure 3;

Figure 5 is an enlarged, perspective view of an intermediate turbine counter-vane; and Figure 6 is a cross section taken on line 6—6 of Figure 5.

The present invention is capable of embodiment in power plants and gas turbine machines varying considerably in character and application. In the following description the invention will be disclosed embodied in an internal combustion reaction type power plant useful in the propulsion of aircraft, and the like, it being understood that this is not to be construed as limiting either the scope or application of the invention.

The portion of the power plant herein disclosed comprises generally the combustion chamber Z, gas turbine G2, secondary combustion zone S, and the propulsive reaction nozzle N, which are hereinafter more fully described in the order named.

The present invention is embodied in the combustion chamber, turbine, and nozzle portions of the power plant, and is more particularly concerned with the injection of fuel into the combustion chamber, the expansion zone of the turbine, and the secondary combustion zone. In the drawings I have illustrated the aforementioned portions of the power plant and the associated features of the invention, the compressor means being omitted as unnecessary to a full understanding of the invention. In the class of power plants under consideration, single or multiple stage compressor means is driven by the turbine to supply air under pressure to the combustion chamber. Figure 1 illustrates a main housing 10 for containing the compressor means and shows an annular passage 109 in the housing for conducting the air from the compressor means to the combustion chamber Z. The shaft 66 for driving the compressor means extends forwardly into the housing 10 and is coupled at its rear end with the turbine shaft 164 to be subsequently described.

The combustion chamber Z into which the compressor discharges, is an approximately annular space of slightly diminishing average diameter towards its outlet, defined on the outside by the ribbed housing 115 and on the inside by a concentric partition 116, both preferably fabricated from a heat resistant material such as a nickel-chromium-iron alloy. The combustion chamber Z converges at the rear portion to an annular nozzle 117 having an outlet passage of reduced area containing a nozzle ring structure containing a plurality of circumferentially spaced airfoil shaped vanes 223 as hereinafter more fully described.

The forward or inlet end of the combustion chamber contains a pair of concentrically positioned annular ring structures 118 and 119 attached respectively to the forward end at the outer and inner shrouds of the combustion chamber. The outer ring has two concentric, annular rows of circumferentially spaced openings as shown at 120, 121, and the inner ring has three concentric rows as shown at 122, 123 and 124 in Figure 1. A centrally positioned annular opening 125 is formed between the two ring structures. Substantially annular and concentrically positioned shroud members 126 and 127 extend rearwardly into the combustion chamber from the ring structures 118 and 119 to form an approximately annular combustion zone at 131 therebetween. Relatively narrow annular air spaces 132 and 133 are formed between the combustion zone shrouds and the enclosing walls 115 and 116 of the combustion chamber and the outer annular rows of openings 120 and 123 make connection between the inlet passage 110 and the said annular air spaces 132 and 133 surrounding the combustion zone.

At the inner margins of the ring-shaped structures defining the beforementioned centrally positioned annular opening 125, is a second pair of concentrically disposed inner shroud members 135 and 136 extending into the forward portion of the combustion zone 131, said inner shroud members being shaped to converge toward their inner ends to form, in effect, an approximately annular shaped central nozzle passage. The intermediate passages 137 and 138 thus defined, leading into the combustion zone from the vaned openings 121 and 124 between the inner shroud members 135 and 136 and the outer shroud members 126 and 127, are venturi shaped in cross sectional appearance.

A plurality of fuel spray jets 140 extends into the forward portion of the beforedescribed central annular nozzle passage 125 at the entrance to the combustion zone and each spray jet is provided with a pair of laterally directed orifices 142 and 143. The said spray heads are supported by and supplied with a mixture of liquid fuel and injection air by means of a pair of concentric pipe nipples which make connection with concentrically arranged circular pipe manifolds 146 and 147 contained within the annular duct leading to the entrance of the combustion chamber. The exterior circular manifold 146 is adapted to be supplied with air under suitable pressure through a lead-in pipe 150 and the interior manifold 147 is adapted to be supplied with liquid fuel under pressure through a concentric lead-in pipe 151.

The beforementioned converging shrouds 135 and 136 between which the fuel spray jets extend are provided with apertures as shown at 152 and 153 opposite and coaxially aligned with each of the laterally directed jet head orifices whereby an atomized mixture of fuel and air may be projected into the contracted portion of the venturi shaped air passages 137 and 138 leading into the combustion zone.

Glow plugs as shown at 155 make threaded connection into the combustion chamber housing and extend into openings provided in the outer combustion zone shroud 126. The glow plugs serve as the initial igniting means for the combustible fuel-air mixture which is formed in and flows through the forward end of the combustion zone.

The gas turbine G2 of the power plant which is contained within the cylindrical housing 160 comprises a hollow rotor 161 having the general shape of a truncated cone which is coaxially positioned within the said power plant with the end of minimum diameter facing rearwardly in the direction of flow of the propellant gases to form an expansion zone of increasing cross sectional area between said rotor and the inside surface of said housing. The turbine rotor 161 is splined at 162 and bolted at 163 to the rear end of a hollow shaft 164, which is in turn, rotatably supported concentrically within the power unit upon a rear main bearing 165 and a forwardly located auxiliary bearing 166.

The gas turbine rotor is provided with a plurality of rows of hollow impeller blades or buckets 169—172 which may be constructed of heat resistant, high strength metal such as a nickel-chromium-iron alloy. The said turbine rotor blades are adapted to be inserted from the inside of the rotor cavity and to make light press fits through suitably shaped openings broached in the rotor shell and are cooled by the flow of cooling air through the hollow rotor as indicated by the arrows in Figure 3.

A plurality of rows of intermediate or stator blades 181, 182, 183 and 184 is provided intermediate the above described rows of turbine impeller blades. The stator blades are supported from the inner surface or lining 185 of the turbine housing. My copending application, Serial No. 580,241, filed February 28, 1945, discloses and claims the means for receiving the stator blades.

In accordance with the present invention, liquid fuel or a mixture of liquid fuel and air, is introduced into the expansion zone of the gas turbine to be consumed in said zone for the purpose of increasing the power output and to augment the efficiency of the power plant as a whole. It is contemplated that the fuel or fuel and air mixture may be introduced at one or more selected points or areas in the expansion zone. In the embodiment of the invention illustrated in the drawings, the fuel is injected into the expansion zone adjacent but spaced from its forward end. It is preferred to distribute the points of introduction of the fuel circumferentially of the turbine wheel to obtain a substantially unbroken annular field of combustion encircling the wheel and it is preferred to space the points of fuel introduction radially to facilitate proportioning of the fuel introduction in accordance with the mass flow through the turbine and prevent excessively high temperatures in any given zone of the turbine. One or more rows of the blading are utilized as the fuel discharging or ejecting elements. For the purpose of exemplifying the invention, I have shown the row of stator blades or intermediates 182 constructed or equipped to inject the fuel or fuel and air mixture. Each of the blades 182 of that row may be utilized to inject the fuel, although in some forms of the invention the fuel may be introduced through selected spaced blades 182 of the row.

Each of the fuel injection blades 182 includes a cambered airfoil-shaped body 200 and a tubular leading edge element 201 as shown in Figures 3, 5 and 6. The tubular elements 201 may be substantially cylindrical, and the leading edges of the blade bodies are grooved or contoured to partially receive the elements. The inner or free ends of the tubular elements 201 are closed, while the outer end portions of the elements extend through radial openings in fittings 204 formed on or attached to the turbine housing 160. The tubular element 201 of each fuel injecting blade 182 has a row of longitudinally spaced fuel discharge ports or apertures 202. These apertures discharge the fuel or fuel mixture at the convex side of the blades adjacent their leading edges; the jets or streams issuing therefrom being substantially normal to the direction of gas flow past the blades. The series of apertures 202 are preferably spaced substantially midway between the inner and outer ends of the blades as shown in Figure 3 so that the resultant zone of combustion is spaced from the wall of the turbine housing 160 and the turbine wheel 161 to prevent overheating of these parts and to leave relatively cool boundary layers of gases at the housing and rotor surfaces. The outer ends of the tubular elements 201 join compression unions 203 at the exterior of the turbine housing. Packing 205 in the fittings 204 is engaged by conical nipples 206 on the unions 203 to provide liquid and pressure-tight seals at the outer ends of the tubular elements. Studs 211 secure the unions 203 to the turbine housing 160 and maintain the nipples 206 in compressive contact with the packing 205. It will be observed that the construction just described is such that the tubular fuel injection elements 201 are readily detachable for servicing and replacement.

The means for supplying the liquid fuel or liquid fuel and air mixture to the injection elements 201 of the blades 182 includes a ring manifold 207 surrounding the turbine housing. The manifold 207 is supplied with fuel or fuel and air mixture under suitable pressure from a selected source (not shown). Pipes or tubes 208 conduct the fuel or fuel mixture from the manifold 207 to nipples 209 at the unions 203 and ducts 210 in the unions maintain the nipples in communication with the tubular blade elements 201. The unions 203 have metering orifices 9 connecting the tubes 208 and the ducts 210 so that the tubular elements 201 constitute vaporizers for the fuel or fuel and air mixture. Thus the fuel is vaporized in the expansion zone of the turbine and is preheated before being discharged for combustion. The vaporizing and flow of the fuel in the elements 201 assists in cooling the blades 182. The studs 211 serve to compress the unions 203 into liquid-tight contact with the nipples 209. It is to be noted that the tubular elements 201 may be removed for servicing or replacement without disturbing the supply manifold 207 or the tubes 208.

The fuel discharged from the orifices 202 provides for combustion within the bounds of a given row of blading where the combustion is aided by a catalytic action resulting from the presence of the heated blade surfaces. In a reactive turbine having a tapering turbine wheel the velocities vary. For example the axial component at the blade tips may be 600 feet per second while the axial component at the surface of the rotor wheel may be 900 feet per second. Thus the velocities in the expansion zone may vary within a wide range and the radially spaced orifices 202 may be proportioned to provide a fuel distribution in accordance with such variations and obtain a uniform or balanced field of combustion.

It is preferred to provide the bodies 200 of the blades with diagonal slots 212. The slots 212 extend longitudinally of the blades and are spaced directly to the rear of the series of apertures 202. The high velocity gases passing through the slots 212 intermix with the fuel discharged from the orifices 202 to assist in providing an efficient mixture for combustion. As best shown in Figure 4, the slots 212 pass through the blades in substantially radial relationship to the longitudinal axis of the turbine.

The nozzle ring 117 at the entrance to the turbine is constructed of a pair of concentric rings 220 and 221 with adjacent convex surfaces so shaped and positioned as to form a smoothly curved converging nozzle passageway as best shown at 222 in Figures 1 and 4. Circumferentially spaced swirl vanes 223 extend radially between said nozzle rings 220 and 221 to impart a spiral flow or swirl to the combustion gases entering the first row of turbine buckets.

At the apex of the turbine rotor, a conical cap member 230 encloses a space 231 into which liquid fuel may be injected under pressure by way of a tube 232 which passes within the bore of the hollow turbine shaft 164. Communication between the tube 232 and the said hollow space 231 for flow of the said fuel is effected by way of a plurality of peripherally spaced orifices as shown at 237, extending through the walls of the tubing adjacent its rearward end and registering with corresponding radial ducts 238 extending through the extreme rearward point of the turbine rotor body. The conical cap 230 is provided with a plurality of divergingly directed orifices 235 equispaced in its periphery and adjacent its end of greatest diameter where it meets and makes fluid-tight connection at 236 with rotor body 161. Provision is thus made for injection of supplementary fuel into the gases leaving the turbine at this point to consume the excess air entering the propulsive nozzle whereby the thrust of the power plant is augmented.

Located immediately at the rear of the gas turbine, and attached at 240 to the gas turbine housing, is the secondary combustion chamber S and nozzle section N which comprises as approximately cylindrical shaped housing 241 carrying a refractory lining 242 of carborundum or like refractory material. The secondary combustion chamber S is shaped and otherwise adapted to efficiently utilize the kinetic energy of the residual velocity of the gas issuing from the turbine expansion zone to be additive to the kinetic energy of the propulsive jet.

An annular shaped baffle 243 having a streamlined section similar to that of an airfoil is concentrically supported adjacent the gas turbine exhaust within the entrance to the secondary combustion chamber and positioned diametrically opposite the beforementioned secondary fuel orifices 235 in the turbine rotor cap 230 by means of a plurality of radially disposed interconnecting streamlined struts 245. This streamlined baffle is preferably constructed of a refractory material such as carborundum or a heat resistant metal such as a nickel-chromium-iron alloy.

The nozzle portion N is provided with inner and outer longitudinally movable airfoil sectioned throat members 246 and 247 respectively which are interconnected by and supported upon a plurality of parallel, axially disposed hollow rods 248 sliding in suitable bearing channels 249. The outer throat member 247 is also slidably supported upon a plurality of hollow piston rods 251 which are fixed at their forward ends to fittings 252 carried on the rear end of the nozzle body. The piston rods 251 are attached to an annular piston 253 which is adapted for relative reciprocation within the annular shaped cylinder 254 within the hollow portion of the said throat member 247. A disclosure of the means for operating the members 246 and 247 is not essential to an understanding of the present invention and is therefore omitted. The nozzle means forms the subject of my copending application, Serial No. 581,994, filed March 10, 1945.

Assuming now by way of example, that a speed of approximately 900 feet per second relative to the air at 50,000 feet pressure altitude has been attained by the power unit in the aircraft with which it may be associated, the operation of the apparatus of this invention is briefly as follows:

At the entrance 110 to the combustion chamber the compressed air from the compressor means (not shown) is divided, a major portion flowing through the vaned annular inlets 121 and 124 and through the venturi shaped annular passages 137 and 138 to the combustion zone 131 in chamber Z. Another portion of the compressed air passes through the annular openings 120 and 123 and thence through the substantially annular clearance spaces 132 and 133 between the ribs of the combustion zone shrouds and the combustion chamber housing, and still another minor portion of the compressed air enters at the central annular opening 125 and flows through the nozzle shaped annular passage between the inner shrouds 135 and 136 which serves to cool the spray nozzle and spray head 141. The balance of the compressed air from duct 110 passes through the openings at 122 and flows through the gas turbine rotor cavity adjacent the main rotor bearing 165. From there a portion of the cooling air turns as indicated by arrows in Figure 3 and flows forwardly along the inner surface of the turbine rotor shell in heat exchange contact with the inner ends of the impeller blade roots and finally is exhausted to the gas turbine expansion zone inlet through the annular cooling air nozzle ring passageway 226 where it joins the combustion gases issuing from the combustion zone 131 in chamber Z in laminar flow.

That portion of the compressed air which passes through the venturi shaped passages 121 and 124 of the entrance to the combustion zone meets and mixes with the atomized spray of fuel projected from the perforations 142 and 143 in the spray nozzle head 141, through the holes 152 and 153 in the inner shroud members 135 and 136. The resultant fuel-air mixture, once ignited by the hot filament of the glow plug 155, continues to burn throughout a substantial length of the combustion zone 131 in chamber Z.

The heated gaseous combustion products and excess air are continuously released from the combustion chamber through the annular nozzle ring 117 and into the initial stages of the gas turbine expansion zone.

The expanded and partially cooled gases from which a portion of the power has been extracted in passing through the gas turbine in the form of rotative torque applied to the turbine shaft 164 is discharged axially from the gas turbine expansion stages into secondary combustion chamber S and thence out through the nozzle N in the form of rearwardly directly and efficiently expanded high velocity reactive gaseous jet. The propulsive force exerted by the reaction of the gases leaving the nozzle N is the thrust which may be utilized in whole or in part to propel the unit and the vehicle with which it is associated.

To obtain maximum efficiency without creating excessively high temperatures in the primary combustion chamber and gas turbine it is preferred to employ the two above described supplemental fuel injection means or systems. The supplementary fuel is supplied to the expansion zone of the gas turbine by the orifices 202 and is supplied to the secondary combustion chamber by the orifices 235 in the nose of the turbine wheel. The fuel discharged from the orifices 235 enters the secondary combustion chamber in the form of a fine spray of a mixture of vaporized and atomized fuel where it meets and mixes, in most part, with the high velocity gases issuing from the gas turbine, with the heavier particles of the unvaporized atomized fuel spray impinging upon the inner surface of the annular shaped refractory baffle 243. Secondary combustion is thus promoted in the intermediate space between the said refractory baffle and the fuel inlet orifices with the excess air associated with the said gas turbine exhaust gases. The said annular baffle 243 serves to prevent the secondary combustion flame and unburnt fuel from directly contacting the inner lining of the combustion chamber and also aids in the surface combustion of the liquid fuel particles which impinge upon it.

In the case of the means for supplying fuel to the expansion zone of the gas turbine, to obtain an intermediate area of combustion, liquid fuel alone or liquid fuel admixed with air is injected into the intermediate portion of the turbine expansion zone through the plurality of injection pipes 201 which are fed under pressure from a suitable source through the manifold 207, laterals 208 and pressure couplings 203 as hereinbefore described. The combustion gases, rich with unconsumed air, support the combustion in the intermediate injection zone and the proper mixture of injected fuel and gases is aided by providing the diagonal slot 212 extending through the intermediate vane 182 at a point immediately downstream from the point of fuel introduction. The slot 212 also serves to broaden the efficient operating range of angles of attack of gases passing therethrough from earlier stages of the turbine.

From the foregoing it will be evident that the invention may have a number of equivalent embodiments and arrangements of associated components. It is to be understood, therefore, that the foregoing is not to be limiting but may include any and all forms of apparatus which are included within the scope of the claims.

I claim:

1. In a gas turbine, a housing, a rotor spaced within the housing to leave an expansion zone for a stream of air-containing propellant gases, at least one row of impeller blades on the rotor projecting into said zone to be acted upon by the stream of propellant gases, at least one airfoil shaped countervane projecting inwardly from the wall of the housing into said zone at the downstream side of the row of impeller blades for changing the direction of the gases leaving the impeller blades, means for injecting fuel from the countervane for combustion in the air-containing propellant gases, said means including walls in the countervane defining a fuel passage and defining at least one fuel discharge port leading from the passage to the upper surface of the countervane adjacent the leading edge of the same, the port being substantially normal to said surface to direct the fuel across the stream of gases leaving said impeller blades, and a nozzle for receiving the gases from the expansion zone and discharging the same in the form of a propulsive jet.

2. In a gas turbine, a housing, a rotor spaced within the housing to leave an expansion zone for a stream of air-containing stream of gases, spaced annular rows of impeller blades projecting from the rotor into said zone to be acted upon by the stream of propellant gases, an annular row of airfoil shaped countervanes projecting inwardly from the housing into the space between the spaced rows of impeller blades for changing the direction of the gases leaving the upstream row of impeller blades for effective action upon the downstream row of impeller blades, and means for discharging fuel from the countervanes for combustion in said air-containing gases, said means including walls in each countervane defining a fuel supply passage and a port leading from the passage to the low pressure surface region of the respective countervane adjacent the leading edge of the same, said ports being substantially normal to the adjacent surfaces of the countervanes to direct the fuel transversely across the streams of said gas flowing between the countervanes.

3. In a gas turbine, a housing, a rotor spaced within the housing to leave an expansion zone for a stream of air-containing stream of gases, spaced annular rows of impeller blades projecting from the rotor into said zone to be acted upon by the stream of propellant gases, spaced annular rows of airfoil shaped stator blades carried by the housing and projecting between the spaced rows of impeller blades for changing the direction of the gases leaving the impeller blades, and means at one of said rows of blades for injecting fuel into said zone for combustion in the stream of air-containing gases, said means including walls in the blades of said row defining fuel passages and defining ports leading from said passages to the upper surfaces of the blades adjacent their leading edges to discharge streams of fuel at substantially right angles to said surfaces.

4. In a gas turbine, a housing, a rotor spaced within the housing to leave an expansion zone for a stream of air-containing propellant gases, spaced annular rows of spaced impeller blades projecting from the rotor into said zone to be acted upon by said gases, an annular row of countervanes carried by the housing and projecting inwardly between said spaced rows of impeller blades to change the direction of propellant gases issuing from between the blades of the row of impeller blades at the upstream side of the row of countervanes, and means associated with at least certain of said countervanes for injecting fuel into said air-containing propellant gases for combustion therein, each of said means comprising a fuel conducting tube projecting into the housing to lie along the leading edge of a countervane and having at least one fuel port for injecting fuel into the intermediate portion of the expansion zone adjacent the leading edge of the countervane, said ports being directed substantially transversely with respect to the direction of gas flow past the respective countervanes, and means for supplying fuel under pressure to said tubes.

5. In a gas turbine, a housing, a rotor spaced within the housing to leave an expansion zone for a stream of air-containing propellant gases, an airfoil shaped countervane carried on the inside of said housing and extending into an intermediate portion of said expansion zone, and means for leading fuel into said countervane and for injecting the fuel into the intermediate portion of said expansion zone from adjacent the leading edge of said countervane, said countervane having an intermediate slot-shaped passageway extending through it from the inner to the outer surfaces whereby a portion of the propellant gases impinging on said countervane may pass through the intermediate portion thereof and co-mingle with the introduced fuel.

6. Power plant apparatus comprising a turbine motor, a turbine housing spaced around the rotor to define an expansion zone for air-containing propellant gases, rows of blades on the rotor extending into said zone, rows of blades on the housing extending into said zone, at least one of said blades comprising a body, and a tubular element at the leading edge of the body, said tubular element having laterally directed orifices, and means for conducting fuel to the tubular element for discharge from said orifices, said body having a slot therethrough spaced from its leading edge to pass gas through the blade to assist in mixing the discharged fuel with the gases.

7. In an internal combustion reaction type power plant the combination of a primary combustion chamber, means for injecting fuel into the primary combustion chamber, a gas turbine receiving propellant gases of combustion from the primary combustion chamber and comprising a rotor, a housing spaced around the rotor to define an expansion zone for said gases, and blading on the housing and turbine extending into said zone, and means on said housing blading for injecting fuel into said expansion zone.

8. In an internal combustion reaction type power plant having nozzle means for discharging gases in the form of a propulsive jet the combination of a primary combustion chamber, means for injecting fuel into the primary combustion chamber, a gas turbine receiving propellant gases of combustion from the primary combustion chamber and comprising a rotor, a housing spaced around the rotor to define an expansion zone for said gases and having an exit for said zone, and blading on the housing and rotor extending into said zone, means on said housing blading for injecting fuel into said expansion zone, a secondary combustion chamber receiving the efflux gases from the turbine means for injecting fuel into the secondary combustion chamber.

9. In an internal combustion reaction type power plant provided with an adjustable nozzle for discharging gases in the form of a propulsive jet the combination of a source of air-containing propellant gas, a gas turbine comprising a rotor, a housing spaced around the rotor to define an expansion zone for receiving said gas, blading on the rotor and housing in said expansion zone, means for injecting fuel into said expansion zone, a secondary combustion zone receiving the efflux gases from said expansion zone means for injecting fuel into secondary combustion zone.

10. Power plant apparatus comprising a turbine rotor, a turbine housing spaced around the rotor to define a falling pressure zone for air-containing propellant gases, rows of airfoil shaped blades on the rotor and the housing within said expansion zone, and means for introducing fuel into said zone at points spaced radially and circumferentially thereof to burn in said gases including fuel vaporizing and discharge elements extending radially into said zone along and forming the leading edges of certain of said housing blades and having radially spaced fuel discharge orifices directed substantially normal to the gas flow past the blades.

11. Power plant apparatus comprising a turbine rotor, a turbine housing spaced around the rotor to define an expansion zone for hot air-containing propellant gases, rows of blades on the rotor and the housing within said expansion zone, tubular elements forming the leading edges of certain of the housing blades and each having a series of fuel orifices spaced apart radially with respect to the rotor, said series of orifices being radially spaced from the rotor and housing, and means for conducting fuel to said element for vaporization therein and for discharge from the orifices thereof to burn in said gases within said zone.

12. Power plant apparatus comprising a turbine rotor, a turbine housing spaced around the rotor to define an expansion zone for propellant air-containing gases, rows of blading on the rotor and the housing within said expansion zone, including tubular fuel injecting elements movably received in openings in the housing to extend into said zone and positioned at blades on the housing, the fuel injected from said elements being burned in said gases, unions at the exterior of the housing carrying said elements, said elements being free for thermal expansion independently of the housing and blades, and means attaching the unions to the housing.

13. Power plant apparatus comprising a turbine rotor, a turbine housing spaced around the rotor to define an expansion zone for propellant air-containing gases, rows of blading on the rotor and the housing within said expansion zone, including tubular fuel injecting elements passing through in openings in the housing to extend into said zone at blades on the housing, the fuel injected from said elements being burned in said gases, unions at the exterior of the housing carrying said elements, said elements being free for thermal expansion independently of the housing and blades, a manifold, tubes conducting fuel from the manifold to the unions, and screws removably attaching the unions to the housing.

NATHAN C. PRICE.

REFERENCES CITED

The following references are of record in the file of this patent:

UNITED STATES PATENTS

| Number | Name | Date |
|---|---|---|
| 864,315 | Lentz | Aug. 27, 1907 |
| 2,149,510 | Darrieus | Mar. 7, 1939 |
| 2,236,426 | Faber | Mar. 25, 1941 |
| 2,242,767 | Traupel | May 20, 1941 |
| 2,243,467 | Jendrassik | May 27, 1941 |
| 2,326,072 | Seippel | Aug. 3, 1943 |
| 2,399,046 | Larrecq | Apr. 23, 1946 |

OTHER REFERENCES

Flight, issue of Oct. 9, 1941, pp. 239 and 242.